(12) United States Patent
Tomkins et al.

(10) Patent No.: US 7,340,060 B2
(45) Date of Patent: Mar. 4, 2008

(54) SYSTEM AND METHOD FOR BEHAVIOURAL MODELLING

(75) Inventors: Benjamin M Tomkins, Kent (GB); Cedric Ladde, London (GB); Craig T Nimmo, Kent (GB)

(73) Assignee: Black Box Intelligence Limited, Hong Kong (HK)

( * ) Notice: Subject to any disclaimer, the term of this patent is extended or adjusted under 35 U.S.C. 154(b) by 145 days.

(21) Appl. No.: 11/258,167

(22) Filed: Oct. 26, 2005

(65) Prior Publication Data

US 2007/0112704 A1    May 17, 2007

(51) Int. Cl.
*G06Q 30/00* (2006.01)

(52) U.S. Cl. ...................................... 380/277
(58) Field of Classification Search ............... 706/21
See application file for complete search history.

(56) References Cited

U.S. PATENT DOCUMENTS

| | | | |
|---|---|---|---|
| 5,136,687 A * | 8/1992 | Edelman et al. ............... | 706/20 |
| 5,235,650 A * | 8/1993 | Jeong .......................... | 382/158 |
| 2002/0114394 A1 * | 8/2002 | Ma ......................... | 375/240.16 |

OTHER PUBLICATIONS

Frias-Martinez et al., "Modeling human behavior in user-adaptive systems: Recent advances using soft computing techniques", 2005.*
Bidel et al. (Bidel), "Statistical machine learning for tracking hypermedia user behavior", 2003.*
Nasraoui et al. (Nasraoui), "Combining Web Usage Mining and Fuzzy Inference for Website Personalization", 2003.*

* cited by examiner

*Primary Examiner*—Anthony Knight
*Assistant Examiner*—Nathan H. Brown, Jr.
(74) *Attorney, Agent, or Firm*—Eagle IP Limited; Jacqueline C. Lui (57) ABSTRACT

The present invention is a computer system that analyses the factual and behavioural data of a group of subjects, extracts the common behavioural patterns from the collection, and is capable of forecasting the behaviour of a new subject when his or her factual data are inputted to the system. It does so by first taking a collection of both the factual data and behavioural data from a group of subjects. A clustering engine is employed to compute a set of exemplars that concisely represent the population. Afterwards, the factual data of a subject, and the corresponding behavioural exemplar that he or she belongs, are fed to a learning module so that it can learn the mapping between the subject's factual data and behavioural exemplar. After learning, the system is able to predict the behaviour patterns when factual data of a new subject is presented.

7 Claims, 8 Drawing Sheets

SYSTEM AND METHOD FOR BEHAVIOURAL MODELLING

FIELD OF INVENTION

This invention relates to systems and methods for collecting factual and behavioral data from subjects and the development of the behavioral model tool that can be used to predict the subject's behavior.

BACKGROUND OF INVENTION

Marketing studies/enterprise questionnaires usually fall short of their objectives because of the subjective nature of the questions. Subjects have a tendency to inaccurately interpret and over/under-analyse information due to possible pressure and time constraints; consequently concealing their impulsions and true nature. This results in statistics not being as accurate as they should.

To overcome this shortcoming the behavioral study of people has taken on an increasing level of importance for businesses. Some websites for instance now record each user's clicks and adapt their layout accordingly. This comes after realising the inefficiency of surveys which are, usually completed in haste, and rarely draw an accurate and rich enough picture of reality. Other attempts to overcome these ambiguities also have limitations.

SUMMARY OF INVENTION

It is therefore an object of the present invention to provide a tool for behavioral modeling and prediction that overcomes the aforementioned limitations.

Whilst questionnaires can be populated easily, behaviors like "buying a car" cannot be produced on demand. The present invention recognizes and addresses the aforesaid problem by proposing a mechanism to link behavioral data to factual data (such as demographics) in order to forecast the potential behavior of subjects. Existing systems that attempt to combine behavioral and factual data together make use of simple statistical techniques and are inadequate to unearth complex behavioral relationships hidden in the data, and accurately infer the subject's behavior by presenting his or her factual data. This invention discloses a system architecture and methodology that uses state-of-the-art techniques in achieving better forecast of the subject's behavior.

Accordingly, there is provided in one aspect of the present invention a computer system for behavioral modeling comprising means for receiving factual data and behavioral data from at least one subject; a clustering engine for grouping the behavioral data to form exemplars automatically, where the exemplars representing the behavioral patterns of at least one subject; and a learning module for mapping the factual data to the exemplars; with the factual data of a subject mapping to one and only one exemplar.

In the preferred embodiment, a selection module is also provided. The selection module is configured to examine the outputs of the learning module upon receiving factual data input of a selected subject, and select at least one exemplar from the clustering engine as the predicted behavioral pattern(s) of the selected subject.

In a more preferred embodiment, the learning module is further configured to learn the mapping from the factual data to the exemplars by (1) selecting a subject and presenting his or her factual data to the learning module, (2) adjusting the internal parameters of the learning module so as to map the factual data to the corresponding exemplar to which the selected subject belongs, (3) selecting another subject and repeating the steps of (1) and (2), and repeating steps (1), (2) and (3) at least once to obtain a good mapping function. The learning module may also contain a set of output elements with each one of the output elements corresponding to one of the exemplars of the clustering engine. Each output element can compute an activation value when the factual data is presented to the learning module with the activation value indicating the strength of mapping of the learning module from the factual data to the corresponding exemplar. Thus, the mapping strength corresponds to the degree of accuracy for the prediction of the behavioral pattern represented by that exemplar, in response to the factual data inputted to the system.

Using the mapping strength, the selection module can be configured to select the appropriate exemplars whose corresponding activation values of the output elements of the learning module satisfy certain pre-determined criterion. For example, the selection module can be configured to select the exemplar whose corresponding output element in the learning module produces the highest strength of activation value. The selection module can also be configured to select those exemplars whose corresponding activation values of the output elements of the learning module satisfy a pre-determined range of values. Alternatively, the selection module may be configured to select those exemplars whose corresponding activation values satisfy a relative threshold. Such threshold may be determined by the difference between the highest activation value of all the output elements in the learning module and a pre-determined value.

In one implementation of the present invention, the above system (with the means for receiving factual data, the clustering engine, the learning module and the selection module) is further configured to receive new factual and behavioral data in a pre-determined time period from at least one subject. The clustering engine and the learning module is further configured to perform the steps of adjusting the internal parameters of the clustering engine and the learning module based on the new data; computing new exemplar values of the clustering engine and activation values of the learning module from factual and behavioral data of a set of test subjects (referred to as "new results" for ease of description); obtaining the differences, using the same test subjects, between the new results and original activation values of the learning module and the exemplar values of clustering engine; and reporting the differences as the behavioral changes of the at least one subject during the pre-determined time period. Furthermore, the new factual and behavioral data may replace some of the original factual and behavioral data so that the same database size is maintained. For example, the same amount and earliest of the data may be replaced accordingly.

In another aspect of the present invention, there is provided a method for behavioral modeling in a computer comprising receiving factual data and behavioral data from at least one subject; grouping the behavioral data using a clustering engine to form exemplars that represent the behavioral patterns of the at least one subject; and performing a mapping using a learning module that maps the factual data to the exemplars.

In the preferred embodiment, the method of the present invention further comprises the steps of examining the outputs of the learning module upon receiving input of factual data of a selected subject; and selecting at least one exemplar from the clustering engine as a predicted behavioral pattern of the selected subject. In the more preferred implementation, the learning step further comprises the steps of (1) selecting a subject and presenting his or her factual data to the learning module, (2) adjusting the internal parameters of the learning module so as to map the factual data to the corresponding exemplar to which the selected subject belongs, (3) selecting another subject and repeating the steps of (1) and (2), and repeating steps (1), (2) and (3) at least once to obtain a good mapping function. The learning step may also be configured to associate each output element of the learning module to one of the exemplars of the clustering engine. As in the system described above, the selection criteria of the activation values may be selected by a user according to his preference.

The present invention has substantial advantages over other methods of combining factual and behavioral data together in behavioral modeling and prediction. In a preferred embodiment of the present invention, the learning module adopts neural network technology in mapping the factual data to the behavioral data. As neural network is capable of performing non-linear mapping, it has an advantage over simple statistical approach. Moreover, it is well known in the art that a neural network employing supervised learning algorithm (i.e. learning with a teacher) has superior performance over unsupervised learning approach (i.e. learning without a teacher). The exemplars from the clustering engine in our invention can provide the 'teachers' to the neural network so that supervised learning algorithm such as the Back-propagation algorithm can be employed. Another advantage in the present invention is that the system can be used to highlight the behavioral shift of the subject population over a pre-determined time frame so that behavioral trend analysis can become possible. Therefore, the present invention becomes a valuable tool for companies to gain objective knowledge of information that was previously merely describable in vague and subjective terms.

DETAILED DESCRIPTION OF THE PREFERRED EMBODIMENTS

As used herein and in the claims, "subject" refers to an entity which has subjective experiences and having the opportunity to make choice(s) or preference(s). "Factual data" refer to the intrinsic properties of the subjects including but not limited to personal information such as demographical data (e.g. age, sex, jobs, etc), or physical attributes (e.g. height, weight, types of matter, etc). "Behavioral data" refer to the responses to stimuli or sequence of actions performed by the subjects as related to the "choices" or "preferences" indicated above, including but not limited to shopping habits, TV viewing habits, etc. The "internal parameters" or "parameters" of the clustering engine and/or the learning module refer to those adjustable values or structures of the respective clustering or learning algorithms. As a specific example, the internal parameters of a neural network learning module are the adjustable weights of its synaptic links. For statistical approach, the internal parameters refer typically to the means and variances of the probability density functions, or similar sets of parameters in statistical modelling. The following detailed description of preferred embodiments illustrates further how these concepts are used according to the present invention.

Figure 1A:
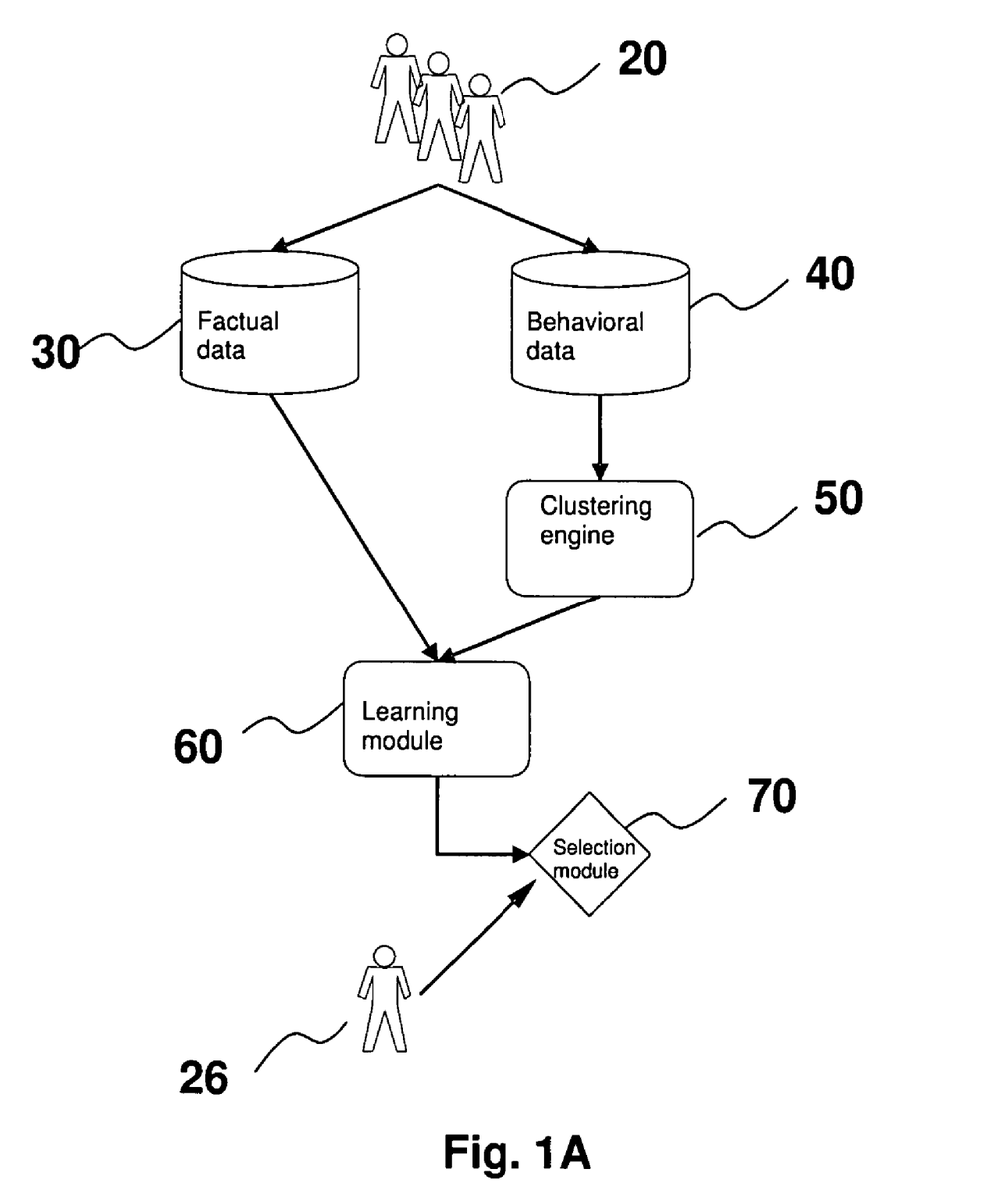
FIGS. 1A, 1B, and 1C are architecture diagrams of computer systems for behavioral modeling according to three embodiments of the present invention. For ease of explanation, like reference numerals are given to the same or corresponding item in the different embodiments.

Referring now to FIG. 1A, the first embodiment of the present invention is a computer system that analyses the behavior patterns of a group of subjects, extracts the common behavior from the collection, and then forecasts how a selected person would behave when his or her personal particulars are inputted to the system. It does so by first taking a collection of both the factual data and behavioral data from a group of subjects 20 to create a factual database 30 and a behavioral database 40. The clustering engine 50 analyses the behavioral database 40 to produce a set of exemplars that concisely represent the group of subjects 20. Afterwards, the factual data of a subject, and the corresponding behavioral exemplar to which he or she belongs, are fed to a learning module 60 so that the learning module 60 can learn the mapping between the subject's factual data and behavioral exemplar. After learning, the results of the learning module and those of the clustering engine form the behavioral model that can be used to predict the behavioral pattern of a selected subject. This is achieved by feeding the factual data of the selected subject to the learning module. This module outputs a set of activation values, which represent the strength of mapping from the factual data to the exemplars. By comparing the activation values against a pre-determined criterion, the selection module 70 chooses one or more exemplars as its output. The behavioral patterns that these exemplars represent are the predictions that the system makes on how the selected subject would behave.

This embodiment represents a behavioral modeling and prediction application involving a group of subjects. Typical examples of this embodiment are marketing survey, direct targeted marketing, etc. Here the exemplars are formed by clustering a large set of data collected from a group of subjects, and the behavior of a new subject is predicted by comparing his or her factual data against the group. In this embodiment, the factual data, stored in factual database 30, represent not only personal data of the individual such as the person's age, place of birth, ethnicity, . . . , etc., but also other information about the individuals such as the area where the person lives, job, income level, . . . , etc. The behavioral data, stored in behavioral database 40, on the other hand, is gathered from the behavior of an individual. This includes, but not limited to, the person's buying habits, preferred packaging, colour choices, tastes, etc. It comes from the interaction of an individual with the outside world and results from a conscious and sub-conscious decision making process. The behavioral data can also encompass a sequence of actions that the subject takes within a pre-determined time period. For examples, the web-pages that the person visits in sequences, or the TV programs that the person watches in one day. The factual and behavioral data can be collected by various means, including but not limited to, a survey, questionnaires that the person has filled out, the response to certain stimulus such as the presentation of pictures, smell, audio or video clips to the subject and the soliciting of his/her answers, or the action-sequence that is observed by an external observer, etc.

Figure 1B:
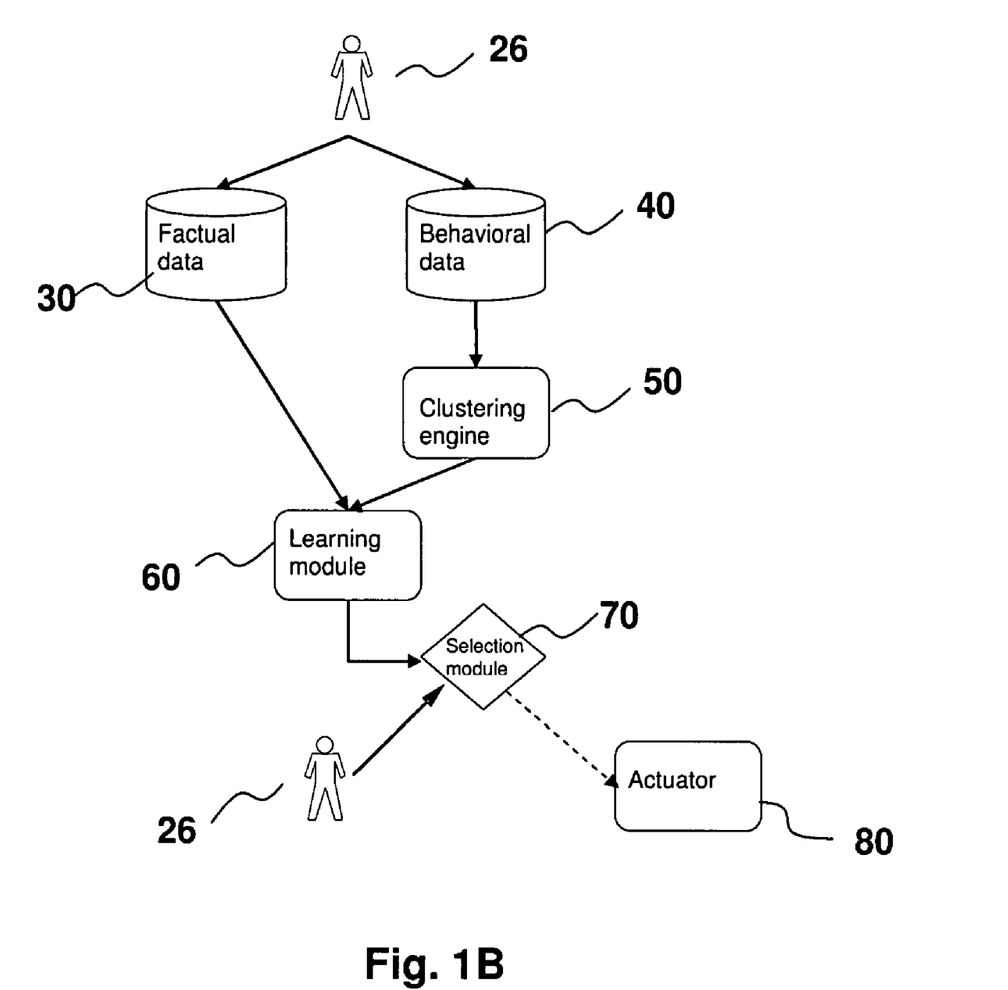

In another embodiment as shown in FIG. 1B, this invention can be applied to analyse and predict the behavior of a single subject 26, thereby acting as a personal assistant who knows the habits of the subject and can recommend/perform the next course of action for the subject when certain factual data is observed. In this embodiment, the behavioral data could be the subject's TV viewing habit, the dining preference or the shopping pattern. The factual data could be the time of date, the location that the subject is in, or similar observable facts. The system operates the same way as shown in FIG. 1A whereby the clustering engine 50 creates the exemplars from the behavioral database 40 and the learning module 60 forms the mapping. After analysing the behavior patterns of the subject, the selection module 70 can suggest to the subject the next course of action or a list of recommendations for the subject to choose once similar factual data is observed. It sends its recommendation(s) to an actuator 80, either to perform the action, or to display the list of recommendations. As a specific example, assuming the subject has a habit of making phone calls during certain time of the day. This invention can interface to the phone-dialing system, and display a set of most frequent dialing numbers, when that specific time is approaching, for the subject to choose from. In this example, the phone-dialing system is the actuator 80. In another example, a subject typically watches news at 7:30 pm every day. When a user switches on the TV around 7:30 pm, the TV controller with the present system installed would be able to switch to the news channel automatically i.e. the TV controller becomes the actuator 80.

Figure 1C:
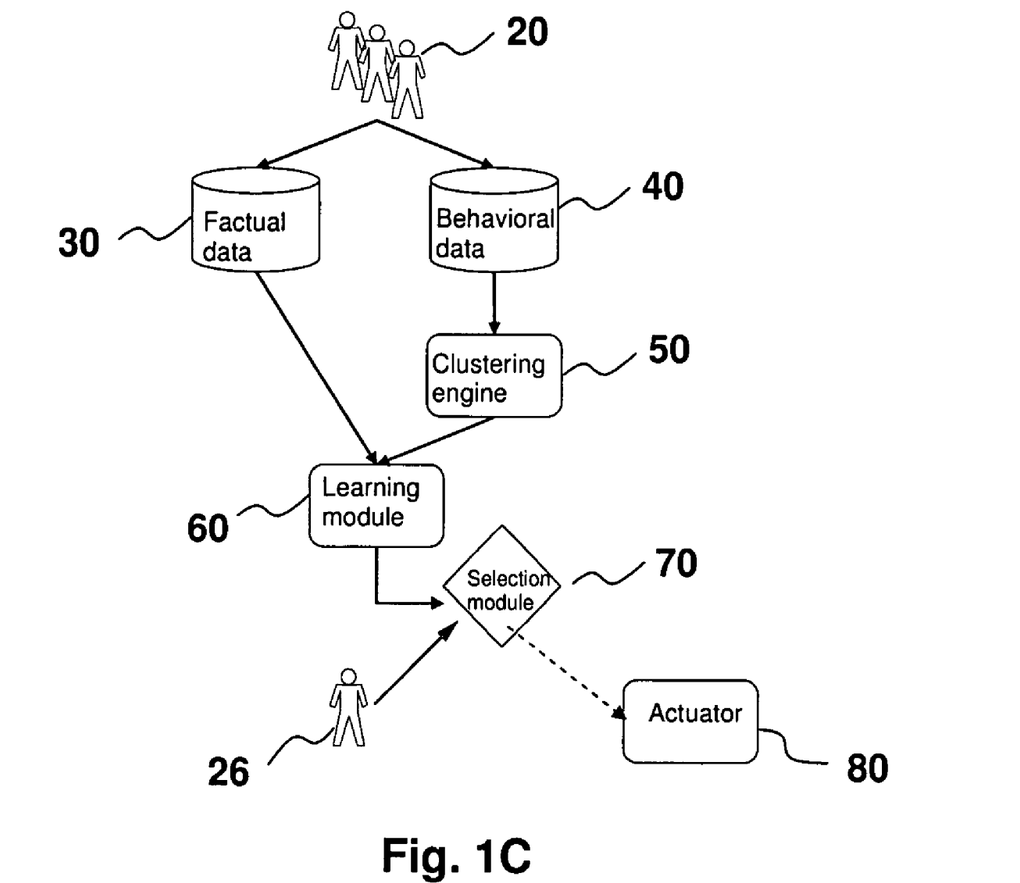

In yet another embodiment, this invention can be used to analyse the work patterns of a group of workers, and assist an individual worker to perform his or her tasks more efficiently. This is shown in FIG. 1C. As a specific illustration, this invention can be used to analyse a group of office workers doing word-processing or similar office work using a personal computer. By observing and analyzing the files that are accessed by this group, and the tasks that this group of workers have been doing, this invention can assist an individual office worker by preparing the necessary documents and tools for him when he comes to work. Here the system shares the same inventive architecture as the previous embodiments shown in FIG. 1A and FIG. 1B. The invention is an intelligent agent that uses a clustering engine 50 to analyse the behavior data 40 of the group; and the learning module 60 finds the mapping from the factual database 30 to the exemplars formed by the clustering engine 50. When an individual office worker 26 logs onto the system, the intelligent agent analyses his or her key-stroke factual data and its selection module 70 will make recommendations based on its prediction. The actuator 80 in this case is a software module that not only opens up the project folder for the subject to work on, but also suggests additional resources for the subject to do that can speed up his or her tasks.

In yet another preferred embodiment, the above office system according to the present invention can be implemented in a hierarchical fashion. The lowest level is to analyse and predict the behavior of an individual worker and serves as a personal assistant as depicted in FIG. 1B. The next level is to analyse a group of workers and to predict the behavior of an individual worker as shown in FIG. 1C. A higher level is to expand the coverage to a department, which typically consists of multiple groups.

Figure 2:
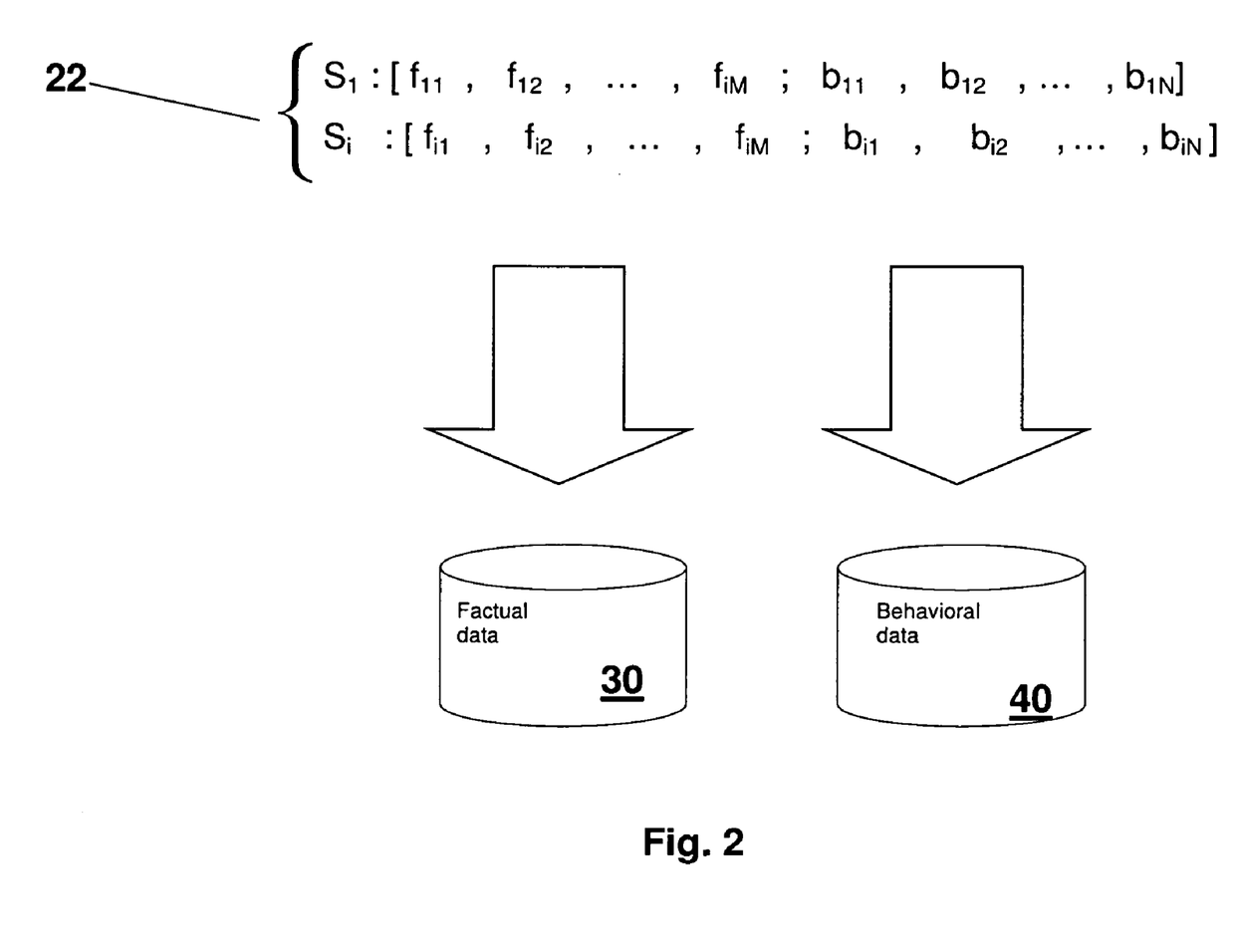
FIG. 2 is an illustration of splitting the data set into factual and behavioral databases according to the present invention.

In a preferred implementation of the above-described systems, the factual and behavioral data can be expressed as a multi-dimension vector as shown in FIG. 2. For each subject, the factual data consists of a set of attributes $\{f_1, f_2, \ldots, f_M\}$, and likewise, the behavioral data is made up of another set of attributes $\{b_1, b_2, \ldots, b_N\}$. The entire dataset 22 consists of a collection of such vectors. The dataset is split into two parts and stored as the factual database 30 and the behavioral database 40 respectively.

Figure 3:
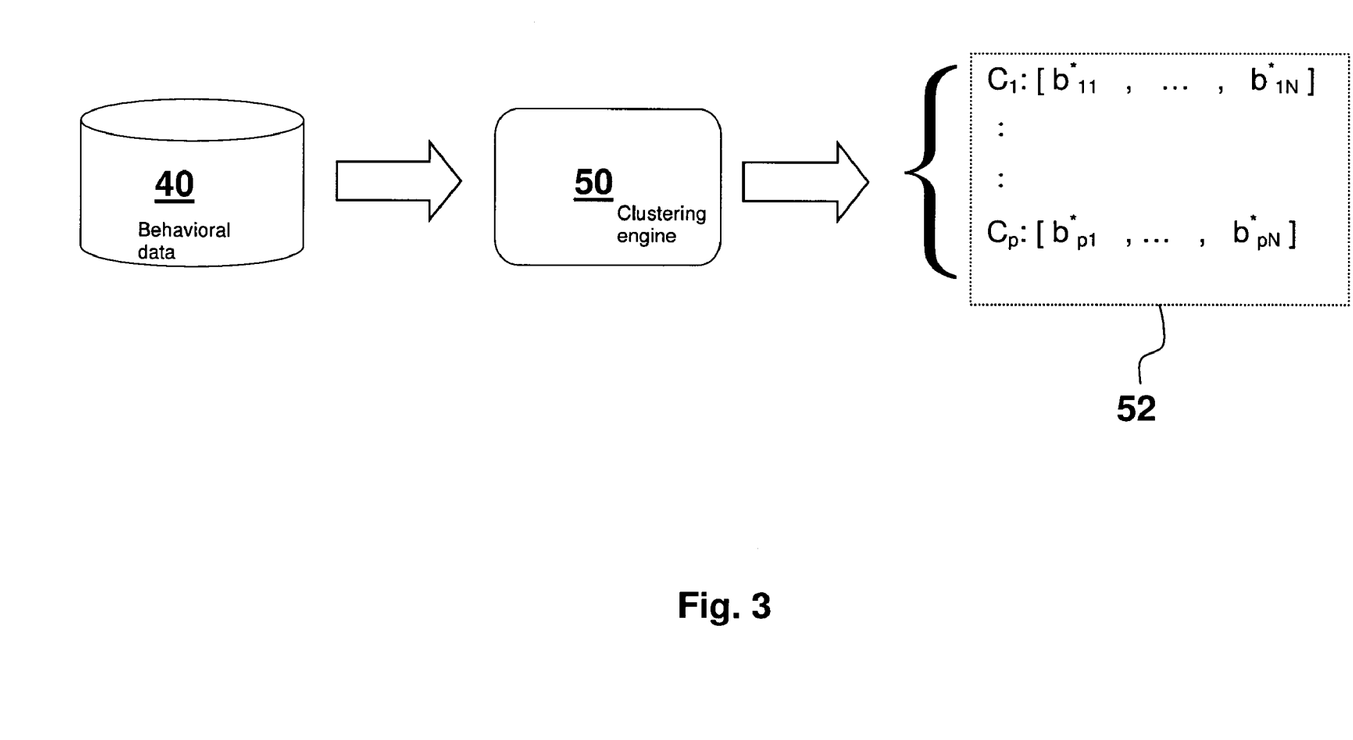
FIG. 3 shows that the clustering engine creates the behavioral exemplars from the behavioral database shown in FIG. 2.

In the preferred embodiment, the clustering engine 50 takes the behavioral database 40 as input, and produces a set of exemplars 52 or clusters that best represent the population as output. This is shown in more details in FIG. 3. Each exemplar has the same number of attributes as the behavioral database.

Many different clustering algorithms can be employed to extract the exemplars from the behavioral database. The present invention needs not be construed that it must work with a specific clustering algorithm. In a preferred embodiment, a clustering algorithm based on the Maximum Entropy principle is employed.

In the present embodiment, a learning module 60 is configured to compute the mapping function between the factual database 30 and the set of exemplars 52 obtained from the clustering engine 50. Specifically, the learning module further comprises a set of input elements, each of which receives input from an attribute of the factual database, and a set of output elements, each of which corresponds to one of the exemplars of the clustering engine. For each subject, his or her factual data $\{f_1, f_2, \ldots, f_M\}$ is retrieved and fed to the input of the learning module, together with the previously identified corresponding exemplar generated from the clustering module. The learning module 60 is to tune its internal parameters in order to establish a mapping between the factual data $\{f_1, f_2, \ldots, f_M\}$ and the corresponding exemplar. This process is repeated for all the subjects in the database, and the same data set may typically be presented in multiple iterations so that a reliable mapping function can be obtained.

Figure 5:
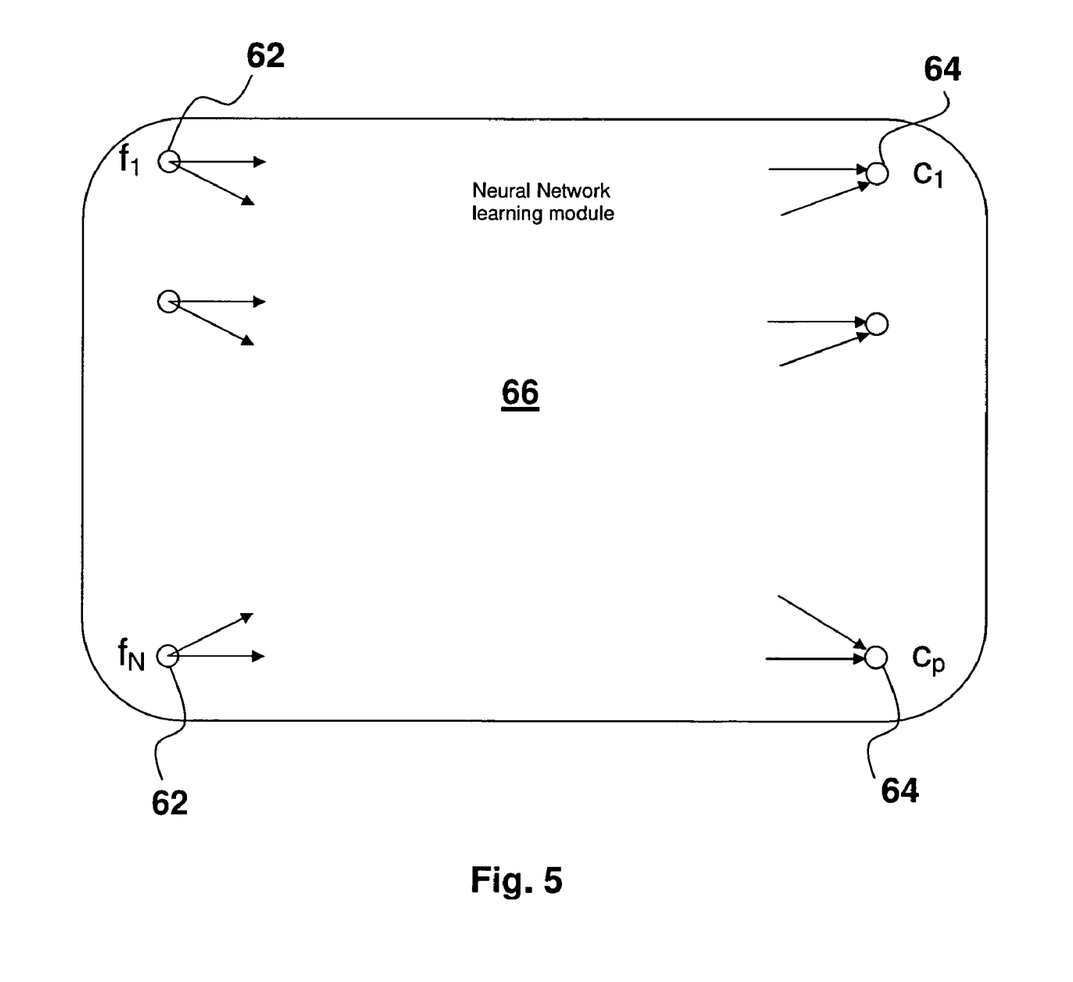
FIG. 5 shows a neural network learning module according to the present invention.

Many learning algorithms can be adopted here to compute the said mapping function. This invention is not necessarily limited to a particular realization or choice of the learning module. In the preferred embodiment, a neural network module can be used to perform the mapping. FIG. 5 illustrates a typical neural network architecture. The neural network learning module 66 is organized as a multi-layer network with at least two layers. The first layer is the input layer 62 as shown in FIG. 5. Depending on how each attribute is to be represented, the number of input neurons is at least equal to, but can be larger than the number of attributes in the factual database. The last layer is the output layer 64. The number of neurons is the same as the number of exemplars. There can be zero or more middle layers of neurons in between the input and the output layer. The neurons are inter-connected by synaptic links so that factual values from input neurons can be forwarded to neurons in middle layers if available, and finally to those in the output layer. Learning takes place in this context by adjusting the weighting values of the synaptic links to realize the mapping from factual data to the exemplars. These synaptic weights are the internal parameters of the learning module.

Figure 4:
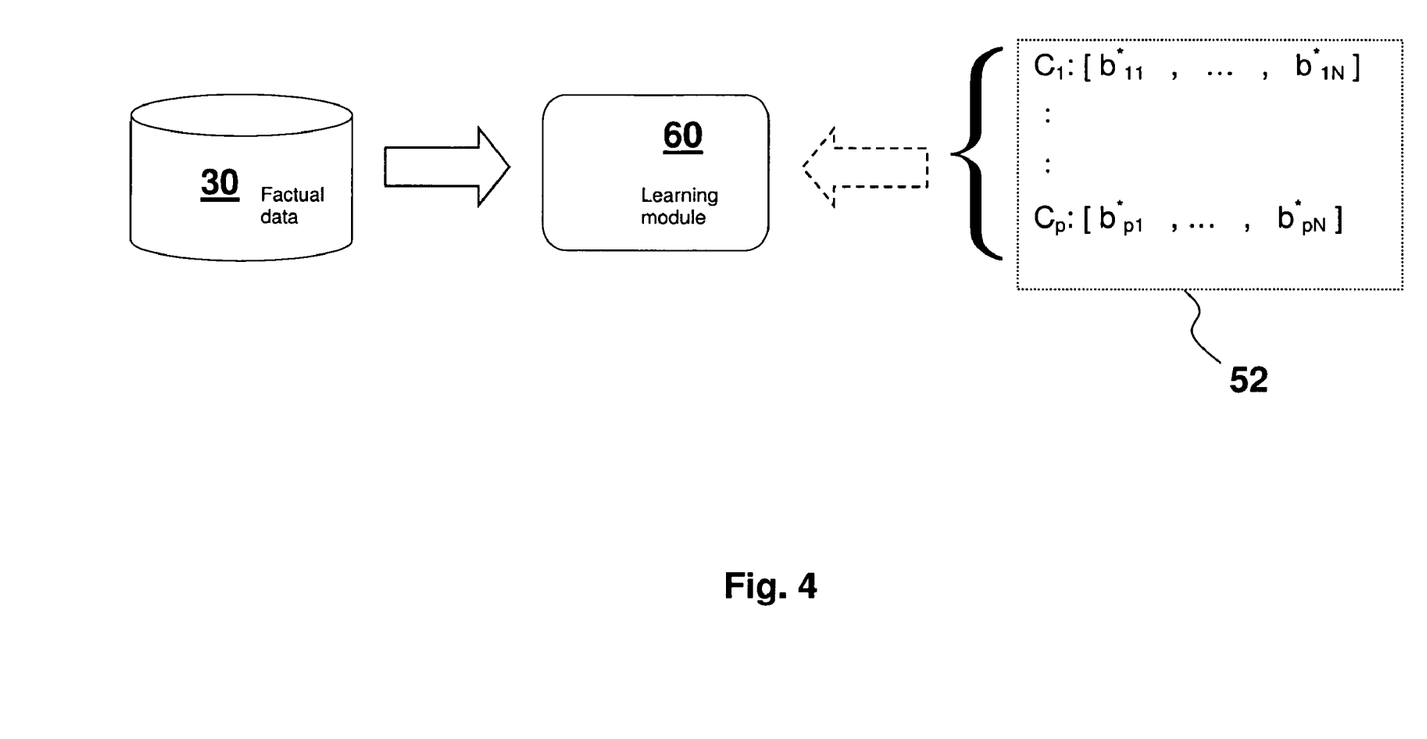
FIG. 4 illustrates that the learning module takes data from the factual database in FIG. 2 and the corresponding exemplars to form the mapping between the two.

There are many kinds of neural network learning algorithms to adjust the synaptic weights for a given neural network structure. Some adopt a supervised learning algorithm (or learning with a teacher) while others employ an unsupervised learning strategy (learning without a teacher). The latter is also referred as self-organization. In the former case, the exemplar from the clustering engine serves as a teacher to teach how the neural network should form the mapping. This is shown in FIG. 4, the factual data of a particular subject, and the corresponding exemplar to which his or her behavioral data belongs, are fed to the neural network as an associated pair, and the neural network will adjust its synaptic weights to establish the mapping association.

For supervised learning, the Back-propagation learning algorithm can be employed, and it is well-known in the art that a multi-layer Back-propagation network can perform non-linear mapping between the input data and the targeted output responses. As discussed previously, other neural models, be it supervised or unsupervised learning, can be adopted to perform non-linear mapping and we illustrate one implementation here as an example.

Figure 6:
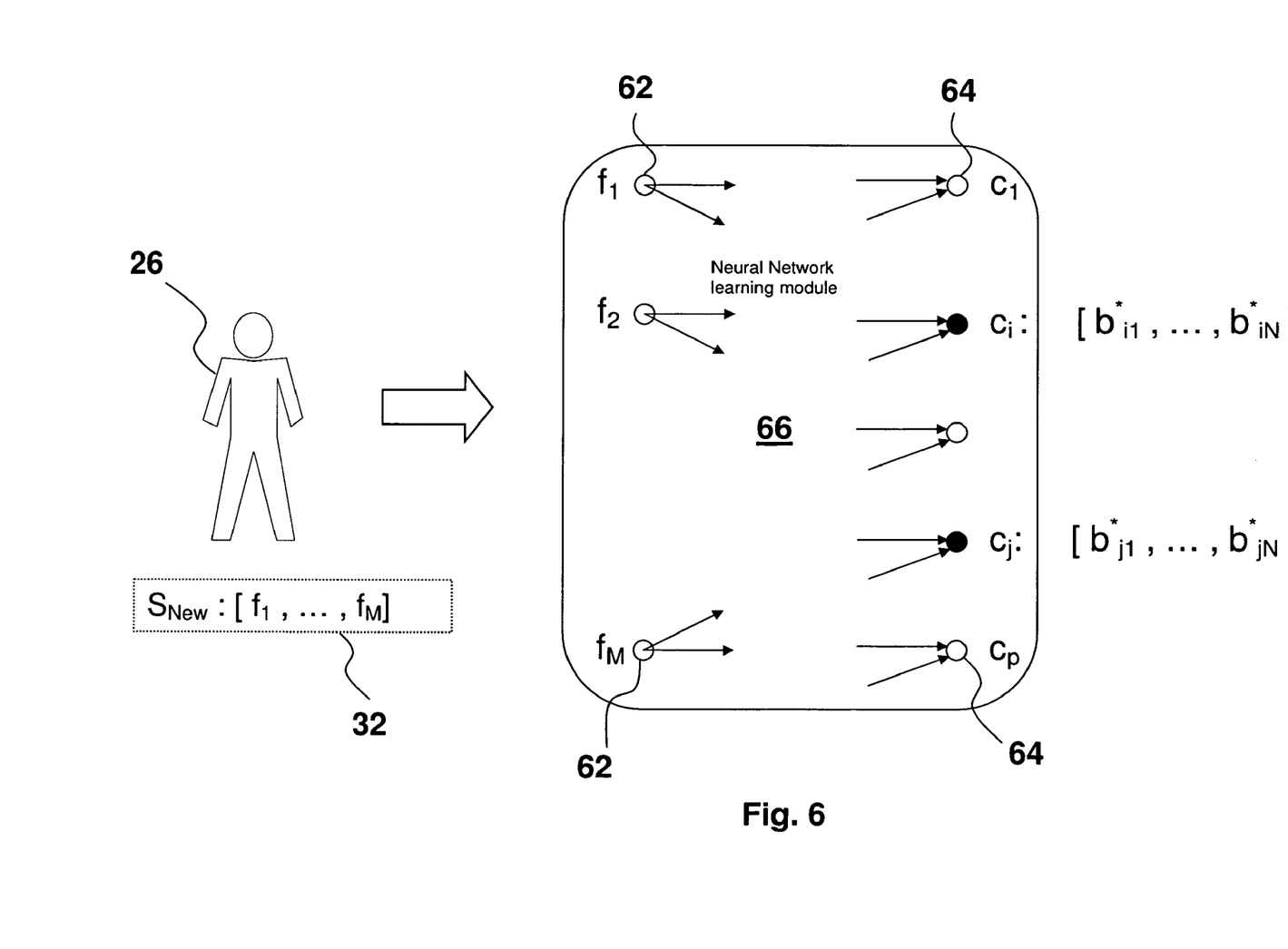
FIG. 6 illustrates that the neural network learning module computes the output responses when new factual data is presented to the module according to the present invention.

After the learning module has established the mapping, the set of parameters in the learning module 60, and optionally those parameters of the clustering engine, can be used to forecast the behavior of a new subject when his or her factual data is presented. This is illustrated n FIG. 6. Here the factual data $S_{new}=\{f_1, f_2, \ldots, f_M\}$ 32 of a selected subject 26 is collected, and presented to the system. The learning module 60 will compute the activation values of output neurons based on the factual data $S_{new}$. Each exemplar will have different degrees of activations. As each output neuron maps to a unique exemplar, the selection module 70 can sort the exemplars according to their levels of activation values, and select one or more exemplars as candidates. Since each exemplar corresponds to a particular behavior pattern, the system thus suggests the possible behavior pattern(s) of the selected subject, based on the new factual data $S_{new}$ presented to the system.

There are many ways for the selection module 70 to select the exemplar(s) from the level of output neuron activation values upon stimulated by the input factual data $S_{new}$. One way is to select the strongest response. It is also possible to set a certain threshold, and choose all those exemplars having a value higher or lower than the threshold. The threshold can be an absolute value, or it can be a relative distance from the highest or lowest response. There are many variations in devising a scheme to select the exemplars. In the preferred embodiment shown in FIG. 6, the exemplars represented by output neurons $C_i$ and $C_j$ are selected. The system will then forecast that the selected subject will have a behavior pattern similar to that of $C_i$ and $C_j$.

In yet another preferred embodiment, this invention can be used to analyse the trend of behavior shift of the subjects under survey. In this embodiment, new factual and behavioral data from existing subjects are collected periodically. The data are merged to the respective factual database 30 and behavioral database 40 together with the original data. The enlarged databases are fed to the clustering engine 50 to create new exemplars, and also to the learning module 60 to find new mapping functions. By comparing the new exemplars with the originals, the differences reveal the shift of the behavior response over the observed period. By performing this in fixed time period, the trend of the behavior shift can therefore be observed. This can be a useful tool for marketing.

In yet another preferred embodiment, the new data collected in the aforementioned paragraph can replace the earliest data, so that the sizes of the respective databases remain constant. This is another alternative approach for the trend analysis.

The preferred embodiments of the present invention are thus fully described. Although the description referred to particular embodiments, it will be clear to one skilled in the art that the present invention may be practiced with variation of these specific details. Hence this invention should not be construed as limited to the embodiments set forth herein. For example, synaptic link in the neural network is described as neuron connection from the input layer to the output layer. It is clear to one skilled in the art that the synaptic link among neurons can be a direct or indirect connection. The direct connection links the input neurons directly to the output neurons whereas for the indirect connection, the input neurons are connected to neurons in one or more middle layers. The later are then further connected to the output neurons.

What is claimed is:

1. A computer system for behavioral modeling comprising
   a. means for receiving factual data and behavioral data from at least one subject;
   b. a clustering engine for grouping said behavioral data to form exemplars automatically, said exemplars representing the behavioral patterns of said at least one subject;
   c. a learning module for mapping said factual data to said exemplars; and
   d. a selection module; said selection module configured to examine the outputs of said learning module upon receiving input of factual data of a selected subject, and selecting at least one exemplar from said clustering engine as a predicted behavioral pattern of said selected subject;
   wherein the system is further configured to receive new factual and behavioral data in a pre-determined time period from at least one subject; said clustering engine and said learning module further configured to perform the steps of
   e. adjusting the internal parameters of said clustering engine and said learning module based on said new data;
   f. computing new exemplar values of said clustering engine and activation values of said learning module from factual and behavioral data of a set of test subjects;
   g. obtaining the differences, using the same said test subjects, between results from step (f) and original activation values of said learning module and original exemplar values of clustering engine before performing step (e) and
   h. reporting said differences as the behavioral changes of said at least one subject during said pre-determined time period.

2. The system according to claim 1 wherein said new factual and behavioral data replaces the same amount and earliest of said factual and behavioral data.

3. A computer system for behavioral modeling comprising
   a. means for receiving factual data and behavioral data from at least one subject;
   b. a clustering engine for grouping said behavioral data to form exemplars automatically, said exemplars representing the behavioral patterns of said at least one subject;
   c. a learning module for mapping said factual data to said exemplars; and
   d. a selection module; said selection module configured to examine the outputs of said learning module upon receiving input of factual data of a selected subject, and selecting at least one exemplar from said clustering engine as a predicted behavioral pattern of said selected subject;

wherein said at least one subject and said selected subject are the same subject.

4. A computer system for behavioral modeling comprising
   a. means for receiving factual data and behavioral data from at least one subject;
   b. a clustering engine for grouping said behavioral data to form exemplars automatically, said exemplars representing the behavioral patterns of said at least one subject;
   c. a learning module for mapping said factual data to said exemplars; and
   d. a selection module; said selection module configured to examine the outputs of said learning module upon receiving input of factual data of a selected subject, and selecting at least one exemplar from said clustering engine as a predicted behavioral pattern of said selected subject;

wherein said at least one subject comprises a plurality of subjects and said selected subject comprises a subject different from said plurality of subjects.

5. A computer system for behavioral modeling comprising
   a. means for receiving factual data and behavioral data from at least one subject;
   b. a clustering engine for grouping said behavioral data to form exemplars automatically, said exemplars representing the behavioral patterns of said at least one subject;
   c. a learning module for mapping said factual data to said exemplars; and
   d. a selection module; said selection module configured to examine the outputs of said learning module upon receiving input of factual data of a selected subject, and selecting at least one exemplar from said clustering engine as a predicted behavioral pattern of said selected subject;

wherein said at least one subject comprises a plurality of subjects and said selected subject comprises a subject chosen from one of said plurality of subjects.

6. A method for behavioral modeling in a computer comprising
   a. receiving factual data and behavioral data from at least one subject;
   b. grouping said behavioral data using a clustering engine to form exemplars, said exemplars representing the behavioral patterns of said at least one subject; and
   c. performing a mapping using a learning module that maps said factual data to said exemplars;
   d. examining the outputs of said learning module upon receiving input of factual data of a selected subject; and selecting at least one exemplar from said clustering engine as a predicted behavioral pattern of said selected subject;
   e. receiving new factual and behavioral data from at least one subject in pre-determined time period;
   f. adding said new data from step (e) to existing factual database and behavioral database;
   g. adjusting the internal parameters of said clustering engine and said learning module using databases in step (f);
   h. computing new exemplar values of said clustering engine and activation values of said learning module from factual and behavioral data of a set of test subjects;
   i. obtaining the differences, using same said test subjects, between results from step (h) and original activation values of said learning module and original exemplar values of clustering engine before step (g) is performed, and
   j. reporting said differences as the behavioral changes of said at least one subject during said pre-determined time period.

7. The method according to claim 6 wherein said new factual and behavioral data replaces the same amount and earliest of said factual and behavioral data.

* * * * *